United States Patent
Suzuki et al.

(10) Patent No.: US 11,465,696 B2
(45) Date of Patent: Oct. 11, 2022

(54) AUTONOMOUS TRAVELING VEHICLE

(71) Applicant: TOYOTA JIDOSHA KABUSHIKI KAISHA, Toyota (JP)

(72) Inventors: Koichi Suzuki, Miyoshi (JP); Toru Nishitani, Nisshin (JP); Jun Usami, Toyota (JP); Minami Yoda, Tokyo (JP); Kensuke Koike, Nisshin (JP); Tsuyoshi Ogawa, Okazaki (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/794,837

(22) Filed: Feb. 19, 2020

(65) Prior Publication Data
US 2020/0290686 A1 Sep. 17, 2020

(30) Foreign Application Priority Data
Mar. 11, 2019 (JP) .............................. JP2019-043851

(51) Int. Cl.
*B62D 33/04* (2006.01)
*G05D 3/10* (2006.01)

(52) U.S. Cl.
CPC .............. *B62D 33/042* (2013.01); *G05D 3/10* (2013.01)

(58) Field of Classification Search
CPC ........ B62D 33/042; B62M 63/02; G05D 3/10
See application file for complete search history.

(56) References Cited

U.S. PATENT DOCUMENTS

| 5,238,282 A * | 8/1993 | Watson | B64D 11/0023 296/24.41 |
| 5,532,521 A * | 7/1996 | Leininger | B60P 3/03 307/10.2 |
| 8,989,053 B1 * | 3/2015 | Skaaksrud | G05D 1/0022 370/255 |
| 9,567,168 B1 * | 2/2017 | Tibbens | B65D 88/027 |
| 10,414,344 B1 * | 9/2019 | Northcott | B60R 7/087 |
| 10,479,418 B1 * | 11/2019 | Patel | G05D 1/0088 |
| 2008/0036238 A1 * | 2/2008 | Weeda | B60P 3/20 296/146.1 |

(Continued)

FOREIGN PATENT DOCUMENTS

| CN | 203864608 U | 10/2014 |
| CN | 107563688 A | 1/2018 |

(Continued)

*Primary Examiner* — Hunter B Lonsberry
*Assistant Examiner* — Daniel L Greene
(74) *Attorney, Agent, or Firm* — Sughrue Mion, PLLC (57) ABSTRACT

The present disclosure relates to an autonomous traveling vehicle having a loading space for loading a package and/or a user. The autonomous traveling vehicle includes: a partition apparatus for performing switching between a partitioned state where the loading space is partitioned into a plurality of spaces separated from each other and a communicating state where the loading space forms one continuous space; and a control unit that controls the partition apparatus such that the loading space is brought into the communicating state when only any one of the package and the user is loaded in the loading space and the loading space is brought into the partitioned state when both of the package and the user are loaded in the loading space.

5 Claims, 5 Drawing Sheets

(56) References Cited

U.S. PATENT DOCUMENTS

| | | | |
|---|---|---|---|
| 2009/0093925 A1* | 4/2009 | Gumbel | B60Q 1/50 |
| | | | 701/36 |
| 2011/0068954 A1* | 3/2011 | McQuade | G06F 16/955 |
| | | | 340/988 |
| 2014/0251556 A1* | 9/2014 | Orton | E05F 15/77 |
| | | | 160/188 |
| 2016/0026967 A1* | 1/2016 | Shah | G06Q 10/08 |
| | | | 701/28 |
| 2018/0181126 A1* | 6/2018 | Seaman | G05D 1/0212 |
| 2018/0186274 A1 | 7/2018 | Gurin et al. | |
| 2018/0239363 A1* | 8/2018 | Yu | G06Q 10/08 |
| 2018/0312082 A1* | 11/2018 | Lalague | B60N 2/01 |
| 2019/0056751 A1* | 2/2019 | Ferguson | G06Q 50/30 |
| 2019/0100151 A1* | 4/2019 | Tait | B60R 21/06 |
| 2019/0130349 A1* | 5/2019 | Ferguson | G06Q 10/083 |
| 2019/0180545 A1* | 6/2019 | Tsujimura | G07C 9/00896 |
| 2019/0225167 A1* | 7/2019 | Takamura | B62D 63/02 |
| 2019/0236538 A1* | 8/2019 | Kaneko | G06Q 10/0832 |
| 2020/0047692 A1* | 2/2020 | Park | G06Q 30/0283 |
| 2022/0101244 A1* | 3/2022 | Prang | G06Q 10/083 |

FOREIGN PATENT DOCUMENTS

| | | |
|---|---|---|
| JP | 6164599 B1 | 7/2017 |
| JP | 2018-177439 A | 11/2018 |

* cited by examiner

AUTONOMOUS TRAVELING VEHICLE

INCORPORATION BY REFERENCE

The disclosure of Japanese Patent Application No. 2019-043851 filed on Mar. 11, 2019 including the specification, drawings and abstract is incorporated herein by reference in its entirety.

BACKGROUND

1. Field of the Disclosure

The present disclosure relates to an autonomous traveling vehicle capable of transporting a package and/or a user.

2. Description of Related Art

There are recently being developed technologies of transporting packages, users and/or the like with a vehicle such as an automobile or a train which can autonomously travel. Japanese Patent No. 6164599 by way of example proposes a technology of causing a vehicle carrying packages to move to delivery lockers at delivery destinations under autonomous driving and housing the packages loaded on the vehicle into the delivery lockers.

SUMMARY

Now, there is a possibility that when packages and users are transported by separate vehicles, the number of vehicles traveling on roads increases and/or transportation costs increase. As a measure against this possibility, one can come up with a method of mixedly transporting packages and users with an identical vehicle by allowing the users to get into a vacant space on the vehicle transporting the packages or by loading the packages into a vacant space on the vehicle transporting the users.

This however causes a possibility that when package and users are mixedly loaded on an identical vehicle using a vacant space in a loading space, security for the packages lowers due to any of the users being accessible to the packages. Moreover, when users are loaded in a vacant space of the loading space in a case where a temperature of the loading space is regulated to be low such as a case where packages that need to be stored at low temperature are loaded in the loading space, there is a possibility that some users are brought into impaired comfort due to the users being exposed to cold air.

The present disclosure is devised in view of the circumstances as above, and an object thereof is to provide an autonomous traveling vehicle capable of excellently transporting a package and/or a person.

In order to solve the problems above, the present disclosure allows, with an autonomous traveling vehicle having a loading space for loading a package and/or a user, the loading space to form one continuous space when any one of the package and the user is loaded, and meanwhile, the loading space to be partitioned into a space where the package is loaded and a space where the user is loaded when both of the package and the user are loaded.

In detail, the present disclosure is an autonomous traveling vehicle having a loading space for loading a package and/or a user. The autonomous traveling vehicle includes: a partition apparatus for performing switching between a partitioned state where the loading space is partitioned into a plurality of spaces separated from each other and a communicating state where the loading space forms one continuous space; and a control unit that controls the partition apparatus such that the loading space is brought into the communicating state when only any one of the package and the user is loaded in the loading space and the loading space is brought into the partitioned state when both of the package and the user are loaded in the loading space.

According to the autonomous traveling vehicle according to the present disclosure, a person and/or a package can be excellently transported.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The present disclosure is a vehicle which can autonomously travel on a road, and has a loading space for loading packages and/or users. Such an autonomous traveling vehicle transports, in a case where a vacant space exists in the loading space such, for example, as a case where few packages are loaded in the loading space or a case where an occupied space by packages is small, users using the vacant space. Effectively using a vacant space in the loading space as above can reduce the number of vehicles traveling on roads, transportation costs, and the like.

Now, when packages and users are mixedly loaded on an autonomous traveling vehicle using a vacant space in its loading space, there is a possibility of low security for the packages due to any of the users being accessible to the packages. Moreover, when users are loaded in a vacant space of the loading space in a case where a temperature of the loading space is regulated to be low such as a case where packages that need to be stored at low temperature are loaded in the loading space, there is a possibility that some users are brought into impaired comfort due to the users being exposed to an environment identical in temperature to that of the packages. Although it can be considered against these problems to partition the loading space of the autonomous traveling vehicle into a plurality of spaces in advance, this causes a capacity of each space to be small and limits sizes, shapes and the like of packages loadable on the autonomous traveling vehicle. In other words, this causes a possibility that a package large in volume, a long package, a package in a special shape, and the like cannot be loaded on the autonomous traveling vehicle.

Therefore, an autonomous traveling vehicle of the present disclosure includes: a partition apparatus for performing switching between a partitioned state where a loading space is partitioned into a plurality of spaces separated from each other and a communicating state where the loading space forms one continuous space; and a control unit which controls the partition apparatus. The control unit controls the partition apparatus such that the loading space is brought into the communicating state when only any one of a package and a user is loaded in the loading space and the loading space is brought into the partitioned state when both of the package and the user are loaded in the loading space. Thereby, when the package and the user are mixedly loaded on the autonomous traveling vehicle using a vacant space in the loading space, a space where the package is loaded and a space where the user is loaded can be separated from each other. As a result, the user can be restrained from accessing the package and from being exposed to the environment identical in temperature to that of the package. On the other hand, when only the package is loaded on the autonomous traveling vehicle, the whole loading space can be used as one continuous package room, which facilitates loading of a package large in volume, a long package, a package in a special shape, and the like on the autonomous traveling vehicle. Therefore, according to an autonomous traveling vehicle according to the present disclosure, a package and/or a user can be excellently transported.

For example, when a plurality of packages are herein transported by the autonomous traveling vehicle, the partition apparatus is controlled to bring the loading space into the communicating state at a time when the autonomous traveling vehicle departs from a delivery start place (place where packages are sorted and loaded on autonomous traveling vehicles or subject to the similar operation, such, for example, as a distribution center). Since the whole loading space can be thereby used as one continuous package room, the autonomous traveling vehicle can carry many packages including a package large in volume, a long package, a package in a special shape, and the like. After the autonomous traveling vehicle carrying the packages as above departs from the delivery start place, a vacant space is to arise in the loading space while the packages loaded on the autonomous traveling vehicle are being sequentially unloaded from the autonomous traveling vehicle at respective delivery destinations. In this stage, a user can be allowed to get into the vacant space. Then, when a request for allowing a user to get in the autonomous traveling vehicle (hereinafter occasionally expressed as "user boarding request") is issued when only the packages are loaded in the loading space in the communicating state and the vacant space exists in the loading space, the control unit may control the partition apparatus to switch the loading space to the partitioned state from the communicating state. According to this, a user can be allowed to get into a vacant space arising in the middle of delivery of packages without giving rise to low security for the packages, impaired comfort of the user, or the like.

Notably, there can be used as the partition apparatus according to the present disclosure an electric shutter apparatus including a shutter curtain which can be wound and let out. In this case, the loading space can be brought into the communicating state by the control unit controlling the shutter apparatus into an opened state (wound state), and the loading space can be brought into the partitioned state by the control unit controlling the shutter apparatus into a closed state (let-out state).

Hereafter, a specific embodiment is described based on the drawings. Dimensions, materials and shapes of components disclosed for the present embodiment, relative arrangements between those, and the like should not be construed as limiting the technical scope of the disclosure to themselves, unless otherwise noted.

Embodiment

For the present embodiment, there is described an example of applying the present disclosure to a transportation service using autonomous traveling vehicles.

Outline of System

Figure 1:
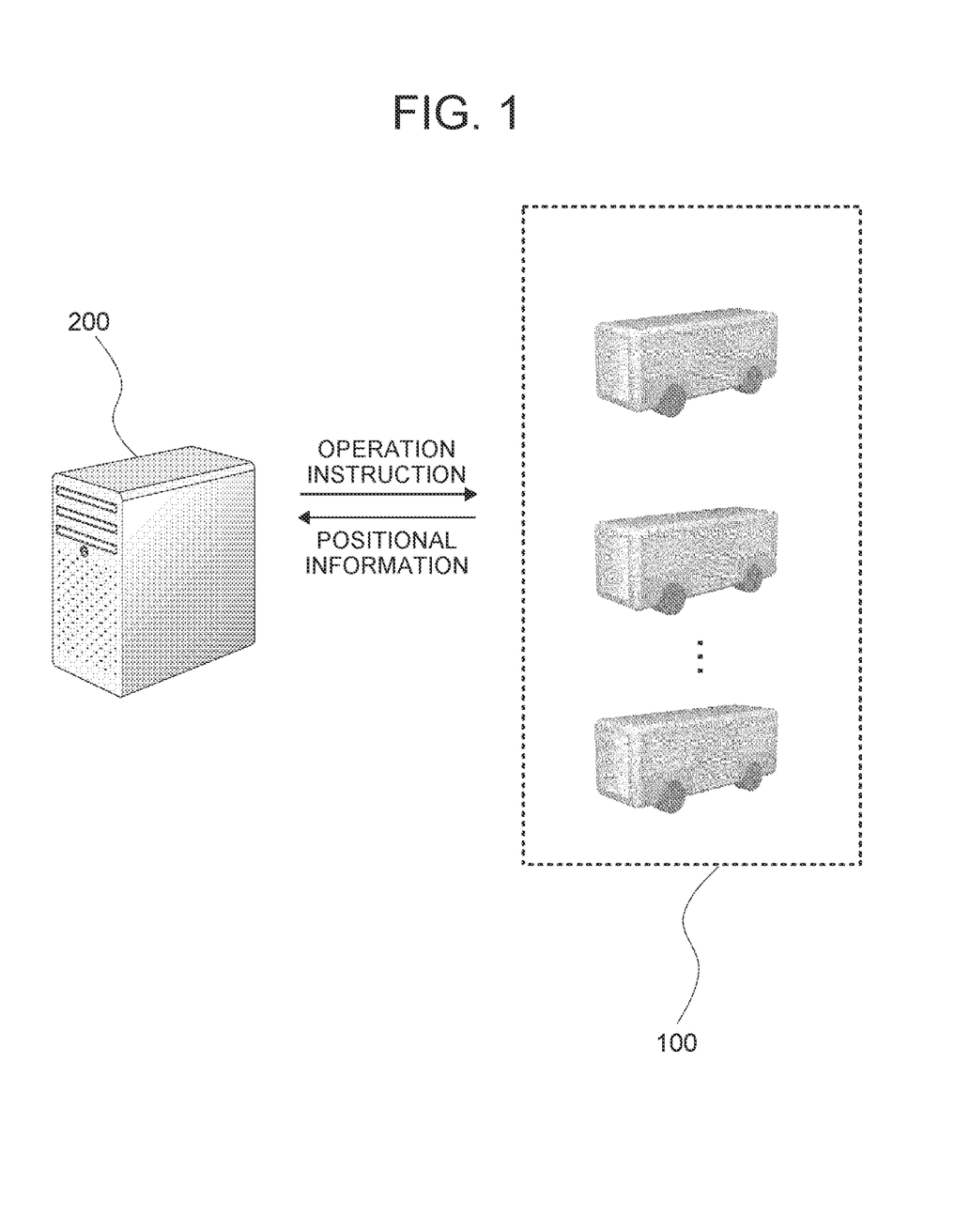
FIG. 1 is a diagram showing a schematic configuration of a system which provides a transportation service using autonomous traveling vehicles.

FIG. 1 is a diagram showing a schematic configuration of a system which provides a transportation service using autonomous traveling vehicles. The system shown in FIG. 1 includes a plurality of autonomous traveling vehicles 100 which autonomously travel in accordance with given operation instructions, and a server apparatus 200 which issues the operation instructions to the autonomous traveling vehicles 100. The autonomous traveling vehicles 100 are self-driving vehicles which provide predetermined service. Meanwhile, the server apparatus 200 is an apparatus which manages and controls operations of the autonomous traveling vehicles 100.

The autonomous traveling vehicles 100 are vehicles which can autonomously travel on roads. Examples of the autonomous traveling vehicles 100 include a bus which can be reserved by users and transports them on a predetermined route, an on-demand taxi which is operated on a route in accordance with requests from users, a package delivery automobile which delivers packages to designated delivery destinations, a long-or-short stay passenger transport automobile which is operated on a route in accordance with requests from users (such, for example, as a vehicle having a hotel facility, a workspace or the like installed therein), and the like. The autonomous traveling vehicles 100 as above are not necessarily vehicles in which any persons other than passengers are not on board. For example, they may be accompanied by service staff serving passengers, security staff securing safety of the autonomous traveling vehicles 100, delivery staff loading and unloading packages, and/or the like. Moreover, the autonomous traveling vehicles 100 are not necessarily vehicles capable of completely autonomously traveling but may be vehicles which are operated by or assisted by driving staff depending on situations. Notably, for this example, there is exemplary presented, as the autonomous traveling vehicle 100 which the present disclosure is applied to, a vehicle which is operated for a main purpose of delivering packages to delivery destinations and includes a loading space which the packages are to be loaded in. Further, the autonomous traveling vehicle 100 is also supposed to be able to transport, when a vacant space arises in the loading space, users using the vacant space.

The server apparatus 200 is an apparatus which instructs the autonomous traveling vehicles 100 to operate. For example, in the case where the autonomous traveling vehicle 100 is a package delivery automobile, the server apparatus 200 transmits, after acquiring a delivery destination of each package, an operation instruction "to deliver the package to the delivery destination from a delivery start place" to the autonomous traveling vehicle 100. Thereby, the autonomous traveling vehicle 100 which has received the operation instruction from the server apparatus 200 can travel along a route based on the operation instruction. Notably, the operation instruction is not limited to an instruction of traveling for connecting the delivery start place and the delivery destination. Examples thereof include an instruction "to travel to a predetermined place to collect a package". As above, the operation instruction may include an action, other than traveling, which is to be performed by the autonomous traveling vehicle 100.

Moreover, in the case where the autonomous traveling vehicle 100 is used as a package delivery automobile, the server apparatus 200 also has a function of transmitting, when a vacant space arises in the loading space of the autonomous traveling vehicle 100, a request for allowing a user to get in the vacant space (user boarding request) to the autonomous traveling vehicle 100.

Configuration of Autonomous Traveling Vehicle

Figure 2:
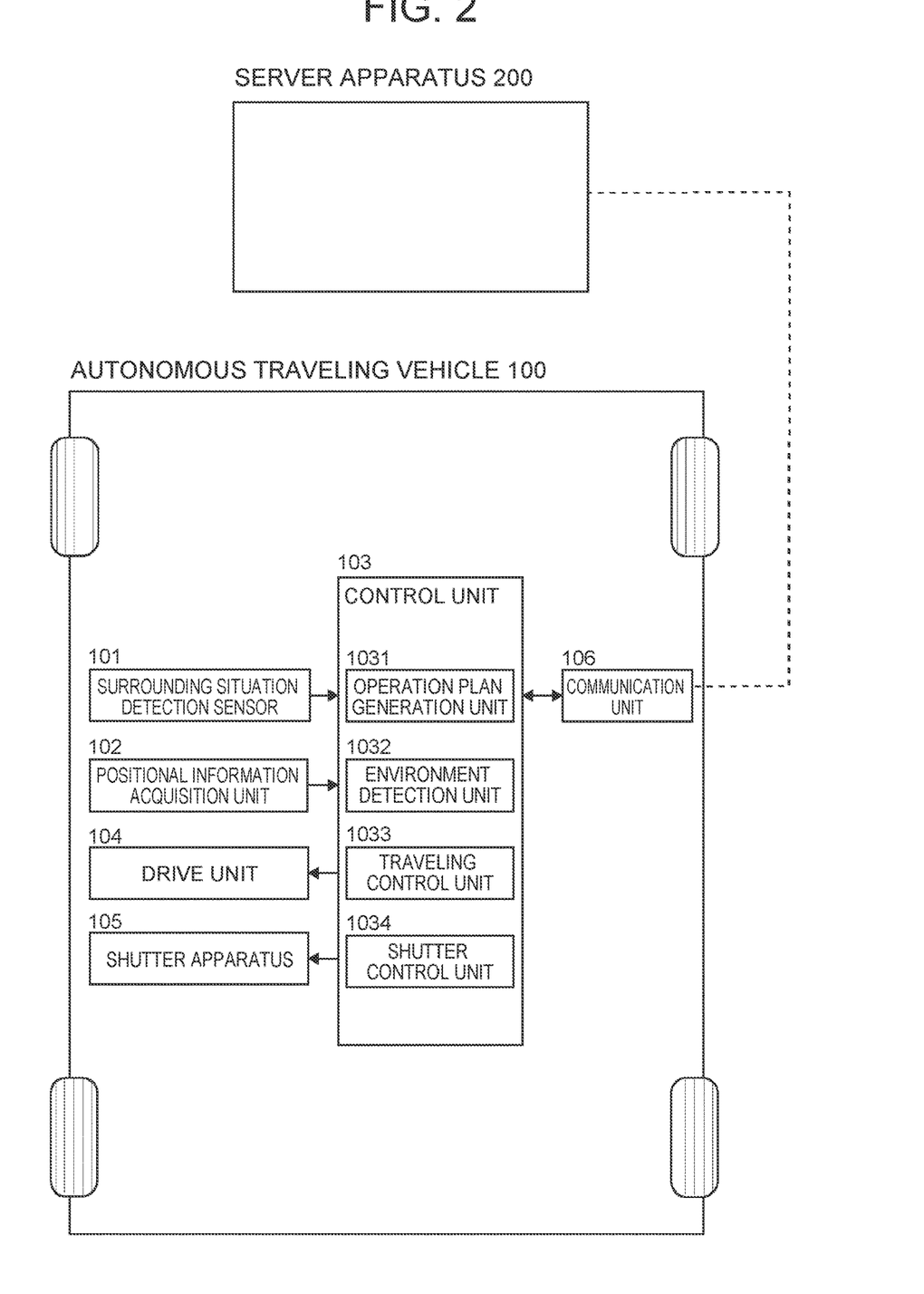
FIG. 2 is a block diagram exemplarily, schematically showing constituents included in an autonomous traveling vehicle in an embodiment.

Next, constituents of the autonomous traveling vehicle 100 in the present example are described in detail. FIG. 2 is a block diagram exemplarily, schematically showing a configuration of the autonomous traveling vehicle 100 shown in FIG. 1.

As mentioned above, the autonomous traveling vehicle 100 is a vehicle which autonomously travels on a road in accordance with an operation instruction acquired from the server apparatus 200. The autonomous traveling vehicle 100 as above includes a surrounding situation detection sensor 101, a positional information acquisition unit 102, a control unit 103, a drive unit 104, a shutter apparatus 105, a communication unit 106 and the like. The autonomous traveling vehicle 100 in the present example is an electric automobile which is driven with an electric motor being as a prime mover. Notably, the prime mover of the autonomous traveling vehicle 100 is not limited to the electric motor but may be an internal-combustion engine or a hybrid mechanism of an internal-combustion engine and an electric motor.

The surrounding situation detection sensor 101 is means for sensing vehicle surroundings, and typically includes a stereoscopic camera, a laser scanner, a LIDAR, a radar and/or the like. Information acquired by the surrounding situation detection sensor 101 is handed over to the control unit 103.

The positional information acquisition unit 102 is means for acquiring a current position of the autonomous traveling vehicle 100, and typically includes a GPS receiver and the like. Notably, the positional information acquisition unit 102 acquires the current position of the autonomous traveling vehicle 100 and hands over information regarding the acquired current position to the control unit 103 at predetermined cycles. In response to this, every time when receiving the positional information from the positional information acquisition unit 102, the control unit 103 transmits the positional information to the server apparatus 200. In other words, the positional information of the autonomous traveling vehicle 100 is transmitted to the server apparatus 200 from the autonomous traveling vehicle 100 at predetermined cycles. Thereby, the server apparatus 200 can grasp the current position of each autonomous traveling vehicle 100.

The drive unit 104 is means for causing the autonomous traveling vehicle 100 to travel, based on an instruction generated by a traveling control unit 1033. The drive unit 104 exemplarily includes a prime mover (an internal-combustion engine, an electric motor, a hybrid mechanism of an internal-combustion engine and an electric motor, or the like), a braking device, a steering system and the like.

The shutter apparatus 105 is an apparatus which switches a loading space between a state where it is partitioned into a plurality of spaces separated from each other (partitioned state) and a state where it forms one continuous space (communicating state), and is an electric shutter apparatus including a shutter curtain which can be wound and let out. Details of the shutter apparatus 105 as above are mentioned later.

The communication unit 106 is communication means for connecting the autonomous traveling vehicle 100 to a network. In the present embodiment, it can communicate with other apparatuses (for example, the server apparatus 200) via the network using mobile communication services in the Third Generation (3G), the Long Term Evolution (LTE) and the like. Notably, the communication unit 106 may further include communication means for performing inter-vehicle communication with the other autonomous traveling vehicles 100. For example, the communication unit 106 transmits current positional information, of the own vehicle, acquired by the positional information acquisition unit 102, an operation plan (scheduled traveling route) generated by an operation plan generation unit 1031 mentioned later, and the like to the server apparatus 200. Moreover, every time when delivery of each package completes, the communication unit 106 transmits delivery completion information of the package to the server apparatus 200.

The control unit 103 is a computer which controls operation of the autonomous traveling vehicle 100 based on the information acquired from the surrounding situation detection sensor 101, controls a traveling state of the autonomous traveling vehicle 100 in accordance with the operation instruction from the server apparatus 200, and controls the shutter apparatus 105 depending on a transportation target of the autonomous traveling vehicle 100. The control unit 103 is constituted, for example, of a microcomputer. The control unit 103 in the present example has, functional modules, the operation plan generation unit 1031, an environment detection unit 1032, the traveling control unit 1033 and a shutter control unit 1034. Each functional module may be realized by causing a central processing unit (CPU) to execute a program stored in storage means such as a read-only memory (ROM), these not shown in the figure.

The operation plan generation unit 1031 acquires the operation instruction from the server apparatus 200 and generates the operation plan of the vehicle. In the present embodiment, the operation plan is data in which a route on which the autonomous traveling vehicle 100 is to travel and processes to be performed on a part or all of the route by the autonomous traveling vehicle 100 are defined Examples of data included in the operation plan include the following.

(1) Data of Route on Which Vehicle is Scheduled to Travel (Scheduled Traveling Route) Which Route is Represented by Set of Road Links The "scheduled traveling route" stated here may be generated, for example, based on the delivery start place and the delivery destination given by the operation instruction from the server apparatus 200 while the operation plan generation unit 1031 refers to map data stored in a storage apparatus mounted on the autonomous traveling vehicle 100. Otherwise, the "scheduled traveling route" may be generated using an external service or may be provided from the server apparatus 200. Notably, in a configuration in which the "scheduled traveling route" is generated by the operation plan generation unit 1031 of the autonomous traveling vehicle 100 or using the external service, it is supposed that the generated "scheduled traveling route" is transmitted to the server apparatus 200 by the communication unit 106 mentioned later.

(2) Data Representing Processes Which Vehicle is to Perform at Arbitrary Places on Scheduled Traveling Route Examples of the processes which the vehicle is to perform include "to allow a passenger to get in or get off", and "to load or unload a package", not limited to these.

The environment detection unit 1032 detects an environment around the vehicle based on the data acquired by the surrounding situation detection sensor 101. Examples of targets to be detected include the number and positions of lanes, the number and positions of vehicles existing around the vehicle, the number and positions of obstacles existing around the vehicle (such, for example, as pedestrians, bicycles, structures and buildings), structures of roads, and traffic signs, not limited to these. The targets to be detected may be whatever autonomous traveling needs. Moreover, the environment detection unit 1032 may track an object thus detected. For example, a relative speed of the object may be obtained from differences between current coordinates of the object and coordinates of the object which are detected previously by one step.

The traveling control unit 1033 controls the vehicle to travel based on the operation plan generated by the operation plan generation unit 1031, the environmental data generated by the environment detection unit 1032, and the positional information of the vehicle acquired by the positional information acquisition unit 102. For example, the traveling control unit 1033 causes the vehicle to travel along the scheduled traveling route generated by the operation plan generation unit 1031, and causes the vehicle to travel such that any obstacles do not enter a predetermined safety area where the vehicle is at its center. Notably, any know method can be employed for a method of causing a vehicle to autonomously travel. Moreover, the traveling control unit 1033 also has a function of controlling the autonomous traveling vehicle 100 to travel in accordance with an instruction from the server apparatus 200.

The shutter control unit 1034 controls the shutter apparatus 105 depending on the transportation target of the autonomous traveling vehicle 100. For example, the shutter control unit 1034 controls the shutter apparatus 105 such that the loading space is brought into the communicating state when the transportation target of the autonomous traveling vehicle 100 is only any one of a package or a user (that is, when only any one of a package or a user is to be loaded in the loading space of the autonomous traveling vehicle 100). On the other hand, the shutter control unit 1034 controls the shutter apparatus 105 such that the loading space is brought into the partitioned state when both of a package and a user are to be transported by the autonomous traveling vehicle 100 (that is, when both of a package and a user are to be loaded in the loading space of the autonomous traveling vehicle 100).

Configuration of Shutter Apparatus

Figure 3:
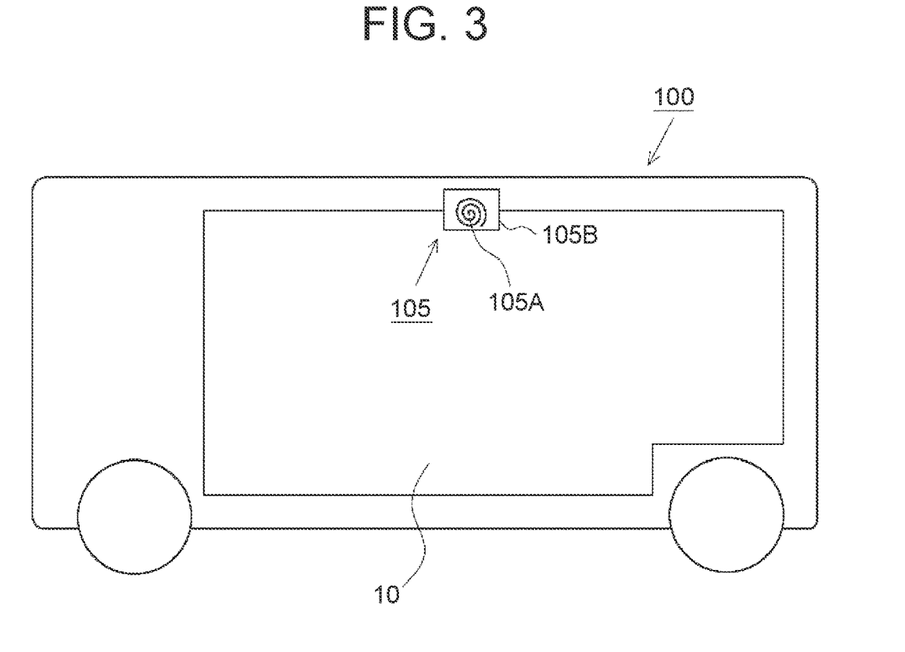
FIG. 3 is a sectional view of the autonomous traveling vehicle with a loading space being in a communicating state as seen from a vehicle-width direction.
Figure 4:
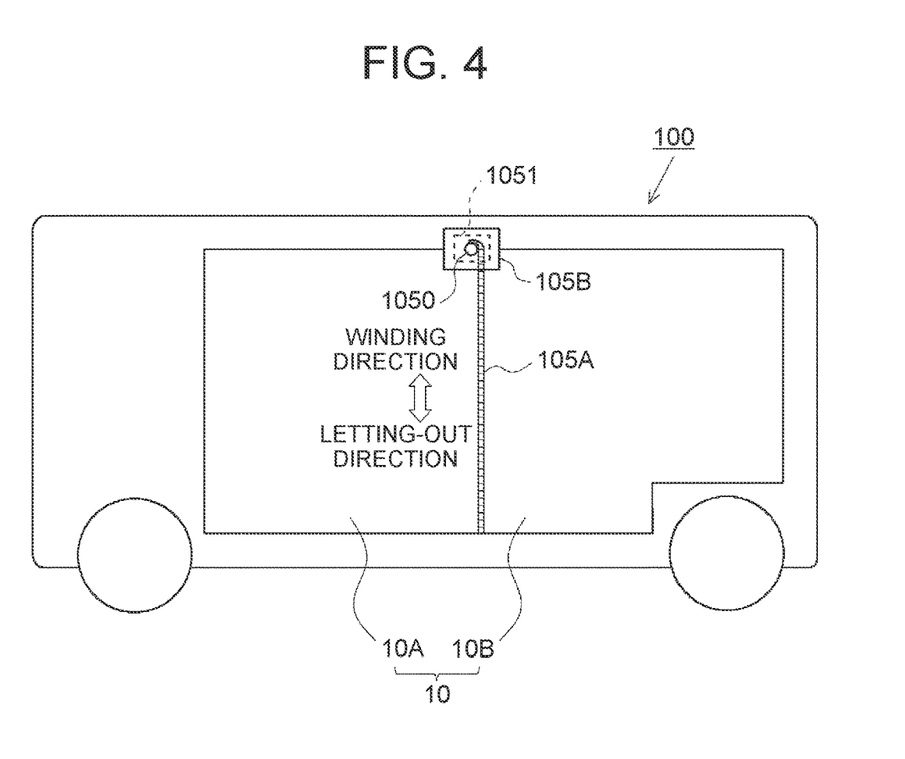
FIG. 4 is a sectional view of the autonomous traveling vehicle with the loading space being in a partitioned state as seen from the vehicle-width direction.
Figure 5:
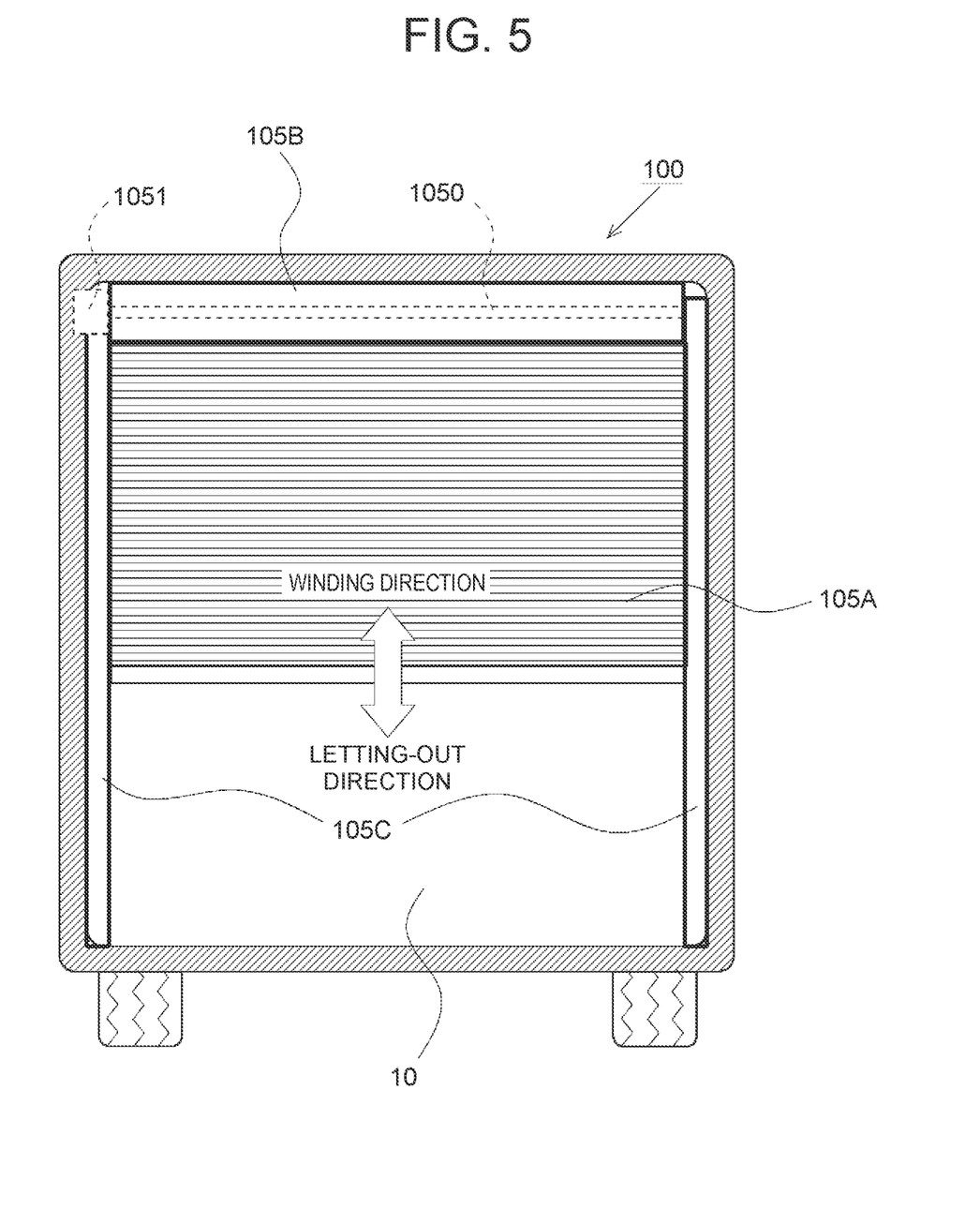
FIG. 5 is a sectional view of the autonomous traveling vehicle with a shutter apparatus being in the middle of winding operation or letting-out operation as seen from a front-rear direction.

Next, a configurational example of the shutter apparatus 105 in the present embodiment is described based on FIG. 3 to FIG. 5. FIG. 3 is a sectional view of the autonomous traveling vehicle 100 with the loading space being in the communicating state as seen from a vehicle-width direction. FIG. 4 is a sectional view of the autonomous traveling vehicle 100 with the loading space being in the partitioned state as seen from the vehicle-width direction. FIG. 5 is a sectional view of the autonomous traveling vehicle 100 with the shutter apparatus 105 being in the middle of winding operation or letting-out operation as seen from a front-rear direction.

The shutter apparatus 105 includes a shutter casing 105B, a shutter curtain 105A formed to be able to be wound and let out, and a pair of guiderails 105C which guide the shutter curtain 105A in a height direction of the autonomous traveling vehicle 100.

The shutter casing 105B is a casing for housing the shutter curtain 105A in a state of being wound. As shown in FIG. 5, the shutter casing 105B in this example is attached onto a ceiling wall in the loading space 10 in a mode of extending in the vehicle-width direction of the autonomous traveling vehicle 100 (right-left direction in FIG. 5. The shutter casing 105B is formed such that a length of the shutter casing 105B in the vehicle-width direction is substantially equivalent to a length of the loading space 10 in the vehicle-width direction. Moreover, there is provided inside the shutter casing 105B a winding shaft 1050 rotationally driven by an electric motor 1051.

The pair of guiderails 105C are attached onto two sidewalls that face each other in the vehicle-width direction out of sidewalls forming the loading space. In this state, the pair of guiderails 105C are arranged so as to extend in the height direction of the autonomous traveling vehicle 100 from both end parts of the shutter casing 105B in the vehicle-width direction to a floor wall in the loading space 10.

The shutter curtain 105A is a member for partitioning the loading space 10 into two spaces 10A, 10B separated from each other, and is formed by foldably coupling a plurality of slats formed of a material not having air permeability, such as resin and metal. As shown in FIG. 4, an end part of the shutter curtain 105A as above in a winding direction is fixed to the winding shaft 1050. Thereby, while the winding shaft 1050 is being rotated in the winding direction by the electric motor 1051, the shutter curtain 105A is being housed into the shutter casing 105B by being folded and wound around the winding shaft 1050. On the other hand, while the winding shaft 1050 is being rotated in a letting-out direction by the electric motor 1051, the shutter curtain 105A which is wound around the winding shaft 1050 is being let out from the inside of the shutter casing 105B. Here in this example, both end parts of the shutter curtain 105A in the vehicle-width direction are engaged with the respective guiderails 105C. Therefore, the shutter curtain 105A being let out from the inside of the shutter casing 105B is guided in the vehicle-height direction by the guiderails 105C, from the ceiling wall side toward the floor wall side in the loading space 10. Further, the shutter curtain 105A being let out from the shutter casing 105B undergoes positioning in the front-rear direction of the autonomous traveling vehicle 100 by both end parts thereof in the vehicle-width direction being engaged with the guiderails 105C. Meanwhile, while the shutter curtain 105A having been let out from the shutter casing 105B is being wound, the shutter curtain 105A is guided in the vehicle-height direction by the guiderails 105C, from the floor wall side toward the ceiling wall side in the loading space 10. Moreover, in this example, a length of the shutter curtain 105A in the letting-out direction is supposed to be set to be, when an amount of letting out the shutter curtain 105A from the inside of the shutter casing 105B becomes at its maximum, not less than a length at which a lower end part of the shutter curtain 105A (end part in the letting-out direction) comes into contact with a floor surface in the loading space 10. Thereby, as shown in FIG. 4, when the amount of letting out the shutter curtain 105A from the inside of the shutter casing 105B is at its maximum or slightly smaller than the maximum, the loading space 10 has been separated into the two spaces 10A, 10B lining up in the front-rear direction of the autonomous traveling vehicle 100.

Operation and Effects of Embodiment

Operation and effects of the autonomous traveling vehicle 100 in the present embodiment are described, exemplified by those in a case where the autonomous traveling vehicle 100 delivers a plurality of packages with different delivery destinations. Notably, it is herein supposed that, at a time when the autonomous traveling vehicle 100 departs from a delivery start place such as a distribution center, only the packages are loaded in the loading space. Therefore, when the packages are loaded in the loading space 10 of the autonomous traveling vehicle 100 at a distribution center or the like, the shutter control unit 1034 controls the shutter apparatus 105 to bring the loading space 10 into the communicating state. In this stage, as shown in FIG. 3, as to the shutter apparatus 105, the shutter curtain 105A is brought into the state of having been wound inside the shutter casing 105B, in other words, the state of having been housed inside the shutter casing 105B. In this case, the whole loading space 10 can be used as one continuous package room. Thereby, the autonomous traveling vehicle 100 can carry many packages including a package large in volume, a long package, a package in a special shape, and the like. As a result, the autonomous traveling vehicle 100 can enhance a delivery efficiency per vehicle.

After the packages are loaded on the autonomous traveling vehicle 100 at the delivery start place, the autonomous traveling vehicle 100 starts to deliver the packages in accordance with an operation instruction from the server apparatus 200. Then, a vacant space is to arise in the loading space 10 while the packages loaded in the loading space 10 of each autonomous traveling vehicle 100 are being sequentially unloaded at respective delivery destinations. It should be herein noted that the number, sizes and the like of the packages loaded in the loading space 10 of each autonomous traveling vehicle 100 at the delivery start place can be registered on the server apparatus 200 side. As mentioned above, each autonomous traveling vehicle 100 has the function of transmitting, every time when delivery of each of the packages loaded on the vehicle completes, the delivery completion information of the package to the server apparatus 200. Since the server apparatus 200 can thereby grasp the number, sizes and the like of remaining packages in the loading space 10 of each autonomous traveling vehicle 100, the server apparatus 200 can therefore also grasp whether a vacant space arises in the loading space 10 of each autonomous traveling vehicle 100. Therefore, when accepting a request from a user who wants to get in an autonomous traveling vehicle 100 in the loading space 10 of which a vacant space arises, the server apparatus 200 can specify the autonomous traveling vehicle 100 in the loading space 10 of which a vacant space arises from among autonomous traveling vehicles 100 that travel via a section from a desired boarding place to a desired getting-off place (desired boarding section) on a desired date and time by the user. Then, the server apparatus 200 may transmits, to the specified autonomous traveling vehicle 100, the user boarding request.

Figure 6:
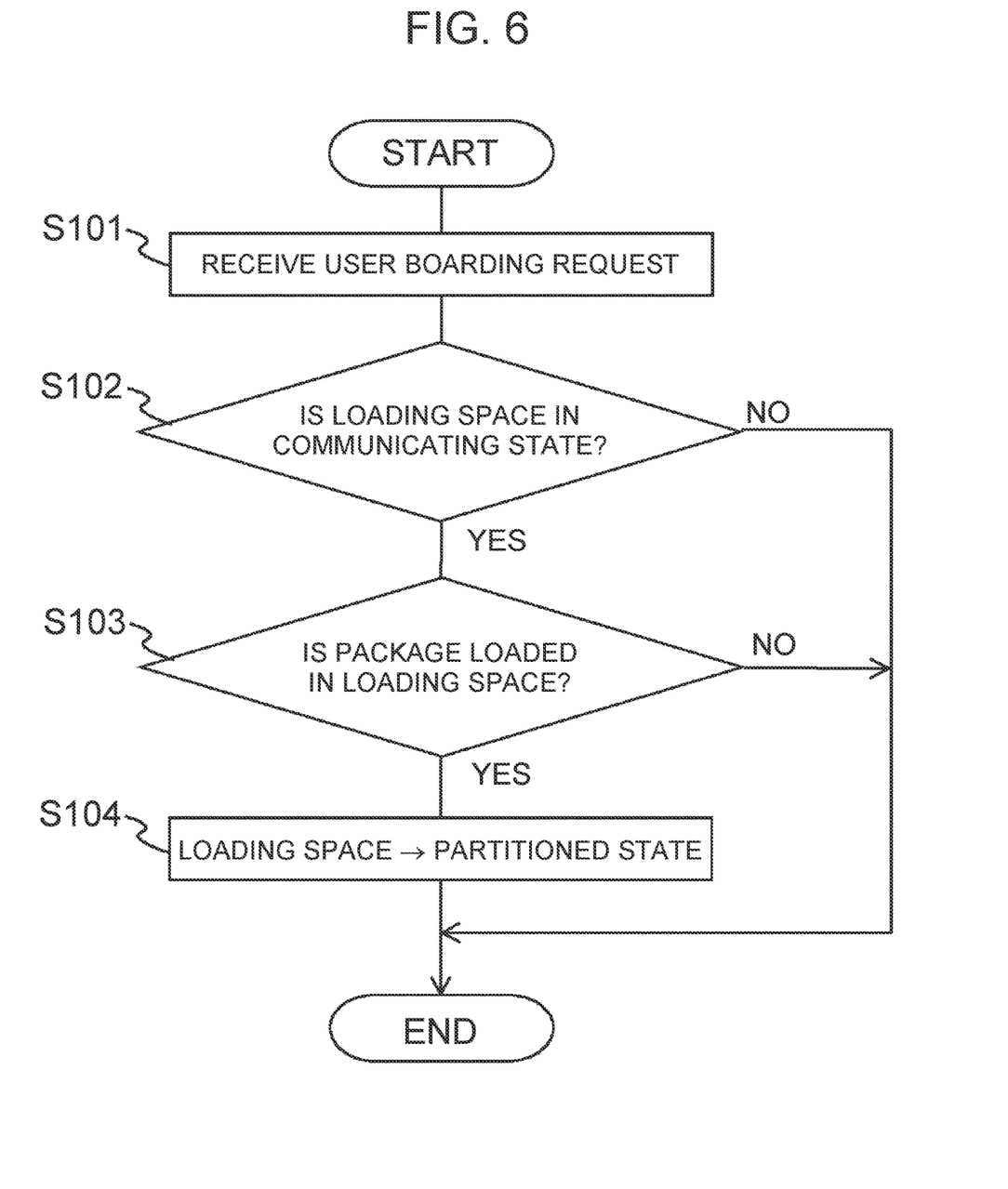
FIG. 6 is a flowchart exemplarily showing a flow of processing performed by the autonomous traveling vehicle when the autonomous traveling vehicle receives a user boarding request.

FIG. 6 is a flowchart showing a flow of processing performed by the autonomous traveling vehicle 100 when the autonomous traveling vehicle 100 receives the user boarding request above.

In the flowchart of FIG. 6, when the communication unit 106 of the autonomous traveling vehicle 100 receives the user boarding request transmitted from the server apparatus 200 (step S101), the shutter control unit 1034 of the autonomous traveling vehicle 100 determines whether the loading space 10 is in the communicating state. Namely, the shutter control unit 1034 determines whether the shutter apparatus 105 is in the let-out state (step S102).

When the loading space 10 of the autonomous traveling vehicle 100 is in the partitioned state (negative determination in step S102), since the loading space 10 has already been in a state of the package and the user being mixedly loaded, the shutter control unit 1034 ends the process. Meanwhile, when the loading space 10 of the autonomous traveling vehicle 100 is in the communicating state (affirmative determination in step S102), the shutter control unit 1034 determines whether some package is loaded in the loading space 10 (step S103). Such determination in step S103 is performed because there is also supposed any of a case where the transportation target loaded in the loading space 10 in the communicating state is a user (another user other than the user who has made the user boarding request in S101) and a case where nothing is loaded in the loading space 10 (transportation of all of the transportation targets has completed at a time when the autonomous traveling vehicle 100 receives the user boarding request above).

When any package is not loaded in the loading space 10 in the communicating state (negative determination in step S103), since the loading space is in a state of only the user being loaded or in a state of nothing being loaded, the loading space 10 does not need to be switched from the communicating state to the partitioned state. Therefore, in the case of the negative determination in step S103, the shutter control unit 1034 ends the process. Meanwhile, when some package is loaded in the loading space 10 in the communicating state (affirmative determination in step S103), since the user who has made the user boarding request in step S101 above is to be loaded (the package and the user are to be mixedly loaded) in a vacant space of the loading space 10 where the package is loaded, the space where the package is loaded needs to be separated from a space where the user is loaded. Therefore, in the case of the affirmative determination in step S103, the shutter control unit 1034 controls the shutter apparatus 105 to change the loading space 10 to the partitioned state from the communicating state (step S104). In this stage, as to the shutter apparatus 105, the electric motor 1051 rotates the winding shaft 1050 in the letting-out direction, so that the shutter curtain 105A having been wound around the winding shaft 1050 is let out from the inside of the shutter casing 105B. The shutter curtain 105A being let out from the inside of the shutter casing 105B is guided by the guiderails 105C as mentioned above, and thereby, expanded in the vehicle-height direction from the ceiling wall side toward the floor wall side of the loading space 10. Then, when the end part of the shutter curtain 105A in the letting-out direction comes into contact with the floor wall in the loading space 10, the electric motor 1051 stops rotating the winding shaft 1050 in the letting-out direction. In this stage, there may be attached to the autonomous traveling vehicle 100 a sensor which detects the end part of the shutter curtain 105A in the letting-out direction coming into contact with the floor wall in the loading space 10, so that the end part of the shutter curtain 105A in the letting-out direction can be detected coming into contact with the floor wall in the loading space 10. As another method, there may be attached to the autonomous traveling vehicle 100 a sensor which detects load acting on the electric motor 1051, so that the end part of the shutter curtain 105A in the letting-out direction can be detected coming into contact with the floor wall in the loading space 10 under a condition that the load detected by the sensor becomes not less than a predetermined threshold. Such control of the shutter apparatus 105 as above is to result in the loading space 10 partitioned into the two spaces 10A, 10B by the shutter curtain 105A as shown in FIG. 4. Thereby, the package can be loaded in one of the two spaces 10A, 10B and the user can be loaded in the other. Namely, the space where the package is loaded can be separated from the space where the user is loaded. As a result, the user is restrained from accessing the package. Moreover, since the slats constituting the shutter curtain 105A is formed of a material not having air permeability, the user is also restrained from being exposed to an environment identical in temperature to that of the package. Therefore, the package and the user can be transported with the identical vehicle without giving rise to low security for the package, impaired comfort of the user, or the like.

Notably, when packages are loaded on the autonomous traveling vehicle 100 at the delivery start place, packages later in the delivery order may be loaded at any one of a position corresponding to the space 10A and a position corresponding to the space 10B, and packages earlier in the delivery order may be loaded in the other. Thereby, time and labor for rearranging the loading positions of the packages or for the similar action can be reduced when the loading space 10 is switched to the partitioned state from the communicating state.

Moreover, it is highly possible, with the autonomous traveling vehicle 100 carrying packages and users, that transportation of the users completes before delivery of all of the packages loaded on the autonomous traveling vehicle 100 completes or that delivery of all of the packages loaded on the autonomous traveling vehicle 100 completes before transportation of the users completes. In other words, there is a high possibility that with the autonomous traveling vehicle 100 carrying packages and users, the state where both of the packages and the users are loaded on the autonomous traveling vehicle 100 moves to the state where any one of the package group and the user group is loaded on the autonomous traveling vehicle 100. In such a case, the shutter control unit 1034 may control the shutter apparatus 105 to switch the loading space 10 back to the communicating state from the partitioned state at a time when transportation of the users completes or at a time when delivery of all of the packages loaded on the autonomous traveling vehicle 100 completes.

According to the embodiment mentioned above, since the whole loading space 10 can be used as one continuous package room when only the packages are transported by the autonomous traveling vehicle 100, the sizes, shapes and the like of packages which can be transported by the autonomous traveling vehicle 100 can be restrained from being limited. Moreover, since when both of the packages and the users are transported by the autonomous traveling vehicle 100, the packages and the users can be loaded in different spaces separated from each other, security for the packages can be restrained from lowering, and comfort of the users can be restrained from lowering. As a result, packages and/or persons can be excellently transported by the autonomous traveling vehicle 100.

Notably, while there has been described in the present embodiment an example of application of the present disclosure to an autonomous traveling vehicle which transports packages, such as a package delivery automobile, the present disclosure can also be applied to autonomous traveling vehicles which transport users, such as a bus which passengers can reserve and share, and an on-demand taxi.

Moreover, while there has been described in the present embodiment an example of the server apparatus 200 specifying the autonomous traveling vehicle 100 where a vacant space arises in the loading space 10 and transmitting a user boarding request to the specified autonomous traveling vehicle 100, the server apparatus 200 may transmit the user boarding request to all of the autonomous traveling vehicles 100 that travel via a desired boarding section on a desired date and time by a user. In such a case, each of the autonomous traveling vehicles 100 receiving the user boarding request needs to determine whether a vacant space exists in the loading space 10. As a measure against this, a camera which can capture an image in the loading space 10 may be attached to each of the autonomous traveling vehicles 100, so that the presence or absence of a vacant space can be determined by the control unit 103 performing image analysis of the image captured by the camera. Then, when it is determined that a vacant space arises in the loading space 10 when the autonomous traveling vehicle 100 receives the user boarding request from the server apparatus 200, information that the user boarding request is to be handled may be transmitted back to the server apparatus 200, and the shutter apparatus 105 may be controlled to switch the loading space 10 to the partitioned state from the communicating state.

Modification 1 of Embodiment

While the embodiment mentioned above is exemplified by an example in which the number of shutter apparatuses attached to the autonomous traveling vehicle in the loading space is one, the number may be two or more. Attaching two or more shutter apparatuses thereto in the loading space enables the loading space to be brought into the partitioned state regardless of a position, size and the like of the vacant space by selecting a shutter apparatus that lets out a shutter curtain and a shutter apparatus that winds a shutter curtain depending on the position, size and the like of the vacant space.

Moreover, such attachment of two or more shutter apparatuses in the loading space also enables the loading space to be partitioned into three or more spaces. For example, the loading space can also be partitioned into a space for loading users, a space for loading packages stored at ambient temperature, and a space for loading packages stored at low temperature. This also enables packages stored at ambient temperature, packages stored at low temperature, and users to be excellently transported.

Modification 2 of Embodiment

While the embodiment mentioned above is exemplified by an example in which a shutter apparatus is used as the partition apparatus according to the present disclosure, a configuration other than the shutter apparatus can also be employed as long as the loading space can be partitioned into a plurality of spaces separated from each other. There can be used, for example, a sliding automatic door including a door pocket and a door which can be housed in the door pocket, a foldable automatic door including a door which can be folded in an accordion-like manner.

What is claimed is:

1. An autonomous traveling vehicle having a loading space for loading a package and/or a user, the autonomous traveling vehicle comprising:
    a partition apparatus for performing switching between a partitioned state where the loading space is partitioned into a plurality of spaces separated from each other and a communicating state where the loading space forms one continuous space; and a control unit that controls the partition apparatus such that the loading space is brought into the communicating state when only any one of the package and the user is loaded in the loading space and the loading space is brought into the partitioned state when both of the package and the user are loaded in the loading space.

2. The autonomous traveling vehicle according to claim 1, wherein the control unit controls the partition apparatus to switch the loading space from the communicating state to the partitioned state upon occurrence of a request for allowing the user to get in the autonomous traveling vehicle, when only the package is loaded in the loading space that is in the communicating state and a vacant space exists in the loading space.

3. The autonomous traveling vehicle according to claim 1, wherein the partition apparatus is an electric shutter apparatus including a shutter curtain capable of being wound and being let out.

4. The autonomous traveling vehicle according to claim 1, wherein the user is a passenger of the autonomous traveling vehicle who is transported during traveling of the autonomous traveling vehicle.

5. An autonomous traveling vehicle comprising:
 a loading space configured to transport any of a package, a user, or both the package and the user;
 a partition apparatus for performing switching between a partitioned state in which the loading space is partitioned into a plurality of spaces separated from each other and a communicating state in which the loading space forms one continuous space; and
 a control unit configured to control the partition apparatus such that (i) the loading space is brought into the communicating state when only the package is loaded in the loading space without the user, and (ii) the loading space is brought into the partitioned state when both of the package and the user are loaded in the loading space.

\* \* \* \* \*